Dec. 8, 1964   R. J. LANGREN   3,159,893
CLAMP
Filed May 7, 1962
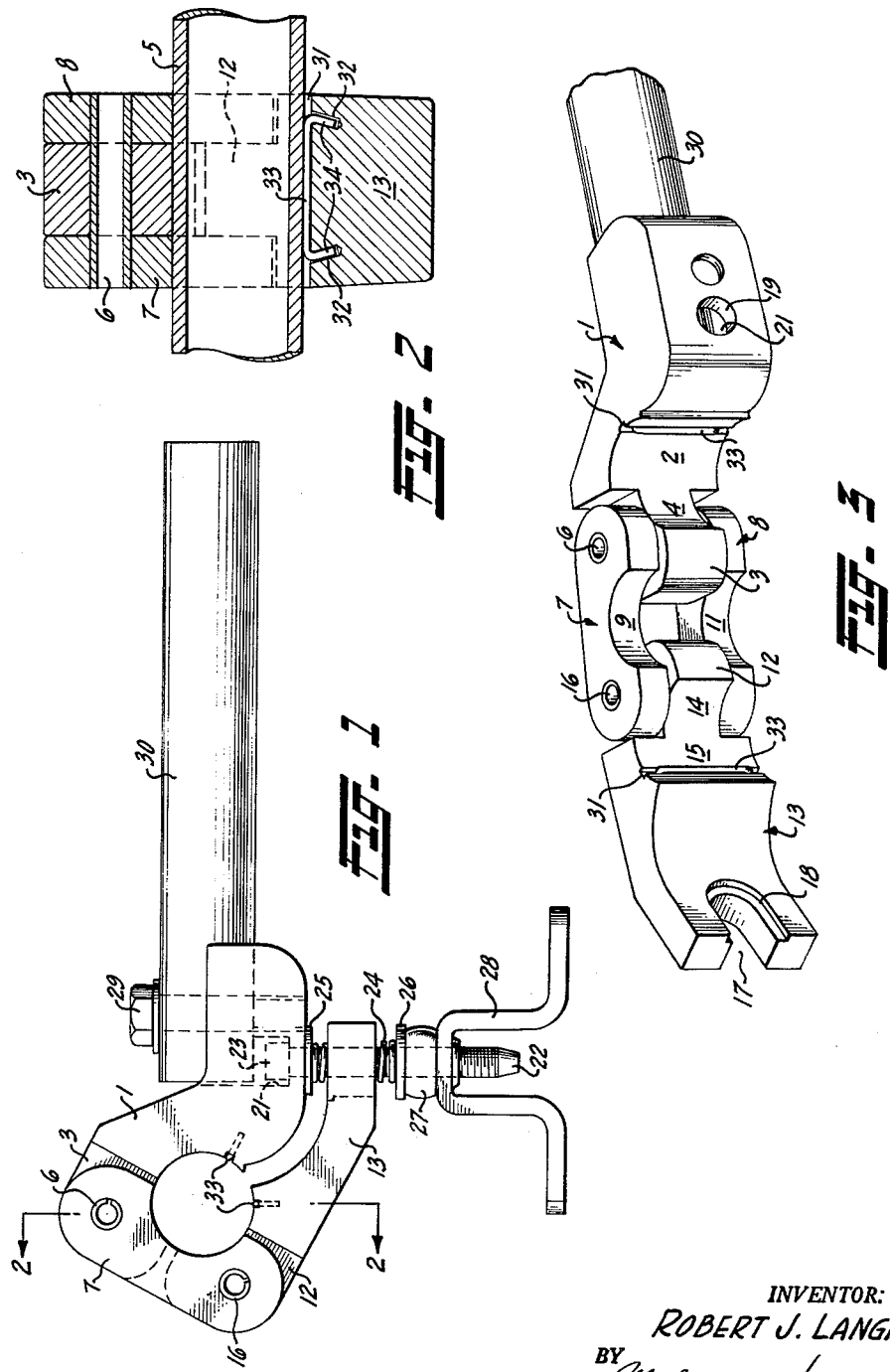
INVENTOR:
ROBERT J. LANGREN
BY
ATTORNEYS

United States Patent Office 3,159,893
Patented Dec. 8, 1964

3,159,893
CLAMP
Robert J. Langren, Alameda, Calif., assignor to Gilbert Hyde Chick Company, Oakland, Calif., a corporation of California
Filed May 7, 1962, Ser. No. 192,784
2 Claims. (Cl. 24—249)

This invention relates to and in general has for its object the provision of a pipe clamp of the nut cracker type.

Many hospital beds and accessory equipment are now made of chrome-plated tubing, and pipe clamps are conventionally used for securing such accessories to the beds. Here it is essential that such equipment be firmly locked against rotation. Although it is possible, by the use of toothed clamping jaws, to obtain a positive lock, jaws of this type result in scoring the chrome-plated tubing and leaving it with a rough and unsightly appearance.

More specifically, the object of this invention is the provision of a clamp of the character above described, including a clamping jaw having a cylindrical clamping surface provided with at least one groove paralleling its axis and a section of piano wire embedded and fastened therein, and wherein the depth of said groove is slightly less than the diameter of said wire.

Another object of this invention is the provision of a clamp of the character above described wherein said section of piano wire is fastened within said groove by bending over its ends and clipping said ends into inclined holes extending through said groove.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is understood that it is not limited to such form, since the invention as set forth in the claims may be embodied in other forms.

Referring to the drawings:

FIG. 1 is a top plan of a clamp embodying the objects of my invention and with the pipe to be clamped omitted.

FIG. 2 is a section taken on the section line 2—2 of FIG. 1 but with the pipe to be clamped shown in place.

FIG. 3 is a perspective view of the clamp illustrated in FIGS. 1 and 2 shown in its fully open position with the pipe to be clamped omitted and with its wing nut also omitted.

The clamp as illustrated in these various figures includes a first clamping jaw 1 provided with a cylindrical clamping surface 2 subtending an angle of substantially 120° and provided with an undercut hinge member 3. Formed on the hinge member 3 is a continuation 4 of the cylindrical surface 2, both of these surfaces being formed on a radius equal to the radius of the pipe 5 to be clamped. Overlying the hinge member 3 and pivoted thereto by a cylindrical pin 6 are the ends of identical hinge links 7 and 8. Formed on each hinge link are central vertically aligned cylindrical clamping surfaces 9 and 11 formed on the same radii as the radius of the cylindrical surface 2.

Disposed between the opposite ends of the hinge links 7 and 8 is the undercut hinge member 12 of a second clamping jaw 13, both members 12 and 13 being provided with cylindrical clamping surfaces 14 and 15, respectively, formed on said radius. Extending through the hinge links 7 and 8 and through the hinge member 12 is a cylindrical pin 16. As best shown in FIG. 3, the outer end of the hinge link 13 is formed with an open slot 17 surrounded on the inner face of the link 13 by an undercut periphery 18.

Extending transversely through the clamping jaw 1 is a bore 19 merging with a rectangular recess 21 formed on the outer face of the jaw 1. Extending through the recess 21 and the bore 19 is a bolt 22 having its head 23 disposed within the recess 21. As indicated in FIG. 1, the bolt 22 in the closed position of the clamp is arranged to extend through the open slot 17. Surrounding the bolt 22 is a compression spring 24 seated at one end on a washer 25 and seated on its other end on a washer 26. Backing the washer 26 is a dome-shaped bearing member 27, and threaded on the bolt 22 and seated on the member 27 is a wing nut 28. By taking up on the wing nut 28 the clamp can be tightened on the pipe 5.

Fastened to the jaw 1 by a bolt 29 is an operating handle 30.

To prevent the clamp so formed from rotating on the pipe 5 when it is clamped thereon without appreciably scoring the surface of the pipe, the cylindrical face of each of the clamping jaws is provided with a longitudinal groove 31. Extending transversely through each groove adjacent its ends are slightly inclined bores 32. Receivable in each groove 31 is a section of piano wire 33 having bent-over or inclined ends 34 sprung into the inclined bores 32. The gauge of the wire 33 and the depth of the groove 31 should be such that the main body of each section of wire extends above the clamping jaw surfaces a matter of from 10 to 20 thousandths of an inch. The clamp per se is preferably made of cast aluminum and is therefore relatively soft. The piano wire, on the other hand, is extremely hard and since the wire protrudes slightly above the clamping jaw surfaces it takes a good bite on the pipe being clamped. However, since the surface of the wire is cylindrical, this action takes place without scoring or otherwise defacing the pipe. This is of considerable importance when the clamp described is used for supporting accessory equipment from hospital beds made from chrome-plated tubing. Here it is essential that such equipment be securely affixed to the bed without danger of rotation. It is this structure which applicant considers to be new, unobvious and useful.

I claim:

1. A clamp for clamping a tube having a hard, finished surface against axial rotation without marring the finish thereof, comprising a pair of clamping jaws each having a cylindrical clamping face of a material substantially softer than said tube surface, there being an axial groove formed on at least one of said clamping faces, and a retaining element substantially harder than said clamping faces disposed on said groove, said retaining element including a section of piano wire of a diameter slightly in excess of the depth of said groove.

2. The device of claim 1, in which the ends of said section of wire are bent over and clipped into spaced inclined holes extending through said groove.

References Cited by the Examiner

UNITED STATES PATENTS

| 1,307,050 | 6/19 | Hohnsbeen | 269—281 |
| 1,412,143 | 4/22 | Steen et al. | |
| 1,642,628 | 9/27 | Philbrick | 24—263.5 |
| 2,093,788 | 9/37 | Vaughn | 24—249 |
| 2,210,750 | 8/40 | Cook et al. | 24—81.3 X |
| 2,655,706 | 10/53 | Spalding | 24—263.5 |
| 2,719,025 | 9/55 | Stone. | |

DONLEY J. STOCKING, Primary Examiner.

ABRAHAM G. STONE, Examiner.